United States Patent
Howard et al.

(10) Patent No.: US 7,242,688 B2
(45) Date of Patent: Jul. 10, 2007

(54) TELEPHONE INTERFACE FOR COMMUNICATING WITH EMBEDDED DEVICES THROUGH A GATEWAY AND ALLOWING ACCESS FROM A REMOTE SERVICE PROVIDER

(75) Inventors: Michael L. Howard, Sandy, UT (US); William R. Harper, Jr., Salt Lake City, UT (US); Stephen C. Coffin, Layton, UT (US)

(73) Assignee: Matsushita Electric Works, Ltd., Osaka (JP)

( * ) Notice: Subject to any disclaimer, the term of this patent is extended or adjusted under 35 U.S.C. 154(b) by 959 days.

(21) Appl. No.: 09/911,152

(22) Filed: Jul. 23, 2001

(65) Prior Publication Data

US 2003/0016659 A1    Jan. 23, 2003

(51) Int. Cl.
*H04L 12/28* (2006.01)
(52) U.S. Cl. .................. 370/401; 379/102.05; 702/188
(58) Field of Classification Search ................ 370/229, 370/290, 235, 351, 352, 354, 356, 389, 401, 370/468
See application file for complete search history.

(56) References Cited

U.S. PATENT DOCUMENTS

| | | | |
|---|---|---|---|
| 4,907,079 A | 3/1990 | Turner et al. | 358/84 |
| 5,379,341 A | 1/1995 | Wan | 379/102 |
| 5,490,210 A | 2/1996 | Sasso | 379/100 |
| 5,838,682 A | 11/1998 | Dekelbaum et al. | 370/401 |
| 6,259,691 B1 | 7/2001 | Naudus | 370/352 |
| 6,295,293 B1* | 9/2001 | Tonnby et al. | 370/389 |
| 6,320,857 B1* | 11/2001 | Tonnby et al. | 370/352 |
| 6,453,687 B2* | 9/2002 | Sharood et al. | 62/127 |
| 6,496,575 B1* | 12/2002 | Vasell et al. | 379/102.05 |
| 6,650,919 B2* | 11/2003 | Edelberg et al. | 600/345 |
| 6,674,745 B1* | 1/2004 | Schuster et al. | 370/352 |
| 6,680,694 B1* | 1/2004 | Knockeart et al. | 342/357.09 |

(Continued)

OTHER PUBLICATIONS

Smarthome.com, Professional 8-32 Zone Security System with X10 ∈ Intercom, pp. 1-7, printed from website Feb. 12, 2001.

(Continued)

*Primary Examiner*—Chi Pham
*Assistant Examiner*—Phuc Tran
(74) *Attorney, Agent, or Firm*—Madson & Austin (57) ABSTRACT

A telephone network interface is disclosed for facilitating communications through use of a telephone with an embedded device through a gateway and for facilitating communications between a remote service provider and the gateway. The telephone network interface includes a telephone interface for electronic communication with a telephone. The telephone network also includes a gateway interface for electronic communications with a gateway. An external telephone network interface is included for connecting the telephone network interface to an external telephone network. In addition, connection control is also provided. Connection control causes the telephone to be selectively in electronic communication with the external telephone network for telephone calls. The connection control also selectively causes the telephone to be in electronic communication with the gateway for communicating with an embedded device such that device requests from the telephone are communicated to the gateway. The gateway is in electronic communication with the embedded device. The connection control further selectively causes the gateway to be in electronic communication with the external telephone network to enable electronic communications between a control service provider and the gateway.

20 Claims, 8 Drawing Sheets

U.S. PATENT DOCUMENTS

| | | | |
|---|---|---|---|
| 6,704,309 B1* | 3/2004 | Nada et al. ................. | 370/389 |
| 2002/0062365 A1* | 5/2002 | Nishikawa et al. ......... | 709/223 |
| 2002/0095269 A1* | 7/2002 | Natalini et al. ............. | 702/188 |
| 2004/0203592 A1* | 10/2004 | Kermode et al. ........... | 455/411 |

OTHER PUBLICATIONS

Smarthome.com, X10 Telephone Responder, pp. 1-2, printed from website Feb. 12, 2001.

Smarthome.com, Control Your Home by Telephone, pp. 1-2, printed from website Feb. 12, 2001.

Smarthome.com, Telephones and Communication, pp. 1-2, printed from website Feb. 12, 2001.

Smarthome.com, Get Temperature ∈ Sensor Status reports Over the Phone, pp. 1-3, printed from website Feb. 12, 2001.

Homecontrols.com, Telephones and Intercoms; for Home CTI and Home Automation Applications, pp. 1-4, printed from website Feb. 12, 2001.

Automatedliving.com, Home Automated Living , pp. 1-8, printed from website Feb. 12, 2001.

Telemaster, PCS Powering Control Systems, pp. 1-2, 1998.

* cited by examiner

TELEPHONE INTERFACE FOR COMMUNICATING WITH EMBEDDED DEVICES THROUGH A GATEWAY AND ALLOWING ACCESS FROM A REMOTE SERVICE PROVIDER

TECHNICAL FIELD

This invention relates generally to computer technology, and is more particularly directed toward systems and methods for communicating with embedded devices through a gateway.

BACKGROUND

In recent years there has been a great increase in the amount of computer technology that is involved in daily life. In today's world, computer technology is involved in many aspects of a person's day. Many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

The small computers, (which can be rather large computers depending on the particular need which is being met by the computer), almost always have one or more processors at the heart of the computer. The processor(s) usually are interconnected to different external inputs and outputs and function to manage the particular device. For example, a processor in a vending machine for soda pop may be connected to the buttons used to select the pop, to the switch that allows a pop to drop down to a user, and to lights to indicate that the machine does not have any more pop of a particular variety.

Computer technology is involved in many aspects of daily life. Many appliances, devices, etc., include one or more small computers. For example, refrigerators, telephones, typewriters, automobiles, vending machines, and many different types of industrial equipment usually have small computers, or processors, inside of them. Computer software runs the processors of these computers and tells the processors what to do to carry out certain tasks. For example, the computer software running on a processor in a vending machine may cause a soda pop to drop to a user when the correct change has been entered by a user.

These types of small computers that are a part of a device, appliance, tool, etc., are often referred to as embedded systems. The term "embedded system" usually refers to computer hardware and software that is part of a larger system. Embedded systems usually do not have typical input and output devices such as a keyboard, mouse, and/or monitor. Usually, at the heart of each embedded system is one or more processor(s).

As computer technology and the use of embedded systems continue to expand and be used in additional areas, there will be an increasing need to be able to communicate with and interact with these embedded systems. In addition, there will be ever-increasing needs in the areas of controlling, monitoring, updating and otherwise servicing embedded systems and/or embedded devices.

SUMMARY AND OBJECTS OF THE INVENTION

It is an object of the present invention to provide systems and methods for communicating with embedded devices.

A telephone network interface is disclosed for facilitating communications through use of a telephone with an embedded device through a gateway and for facilitating communications between a remote service provider and the gateway. The telephone network interface includes a telephone interface for electronic communication with a telephone. The telephone network interface also includes a gateway interface for electronic communications with a gateway. An external telephone network interface is included for connecting the telephone network interface to an external telephone network. In addition, connection control is also provided. Connection control causes the telephone to be selectively in electronic communication with the external telephone network for telephone calls. The connection control also selectively causes the telephone to be in electronic communication with the gateway for communicating with an embedded device such that device requests from the telephone are communicated to the gateway. The gateway is in electronic communication with the embedded device. The connection control further selectively causes the gateway to be in electronic communication with the external telephone network to enable electronic communications between a control service provider and the gateway.

In embodiments herein, the telephone network interface may also further include additional telephone interfaces for electronic communications with a number of telephones.

Embodiments of the control service provider may communicate with the telephone network interface through use of a telecommunications network, a global computer network, a computer network, and the like.

The control service provider may also include schedule data to indicate when certain messages are to be sent to certain embedded devices. In addition, device location data may also be included to indicate the address of certain embedded devices.

The telephone network interface may be combined with the gateway to facilitate communications through use of a telephone with an embedded device and for facilitating communications between a remote service provider and the embedded device. The gateway may be programmed to communicate with the embedded device and may also be programmed to enable communications with the embedded device from a control service provider.

BRIEF DESCRIPTION OF THE DRAWINGS

The foregoing and other objects and features of the present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

It will be readily understood that the components of the present invention, as generally described and illustrated in the Figures herein, could be arranged and designed in a wide variety of different configurations. Thus, the following more detailed description of the embodiments of the system and method of the present invention, as represented in the Figures, is not intended to limit the scope of the invention, as claimed, but is merely representative of the presently preferred embodiments of the invention.

The presently preferred embodiments of the invention will be best understood by reference to the drawings, wherein like parts are designated by like numerals throughout.

A telephone network interface is disclosed for facilitating communications through use of a telephone with an embedded device through a gateway and for facilitating communications between a remote service provider and the gateway. The telephone network interface includes a telephone interface for electronic communication with a telephone. The telephone network interface also includes a gateway interface for electronic communications with a gateway. An external telephone network interface is included for connecting the telephone network interface to an external telephone network. In addition, connection control is also provided. Connection control causes the telephone to be selectively in electronic communication with the external telephone network for telephone calls. The connection control also selectively causes the telephone to be in electronic communication with the gateway for communicating with an embedded device such that device requests from the telephone are communicated to the gateway. The gateway is in electronic communication with the embedded device. The connection control further selectively causes the gateway to be in electronic communication with the external telephone network to enable electronic communications between a control service provider and the gateway.

In embodiments herein, the telephone network interface may also further include additional telephone interfaces for electronic communications with a number of telephones.

Embodiments of the control service provider may communicate with the telephone network interface through use of a telecommunications network, a global computer network, a computer network, and the like.

The control service provider may also include schedule data to indicate when certain messages are to be sent to certain embedded devices. In addition, device location data may also be included to indicate the address of certain embedded devices.

The telephone network interface may be combined with the gateway to facilitate communications through use of a telephone with an embedded device and for facilitating communications between a remote service provider and the embedded device. The gateway may be programmed to communicate with the embedded device and may also be programmed to enable communications with the embedded device from a control service provider.

Figure 1:
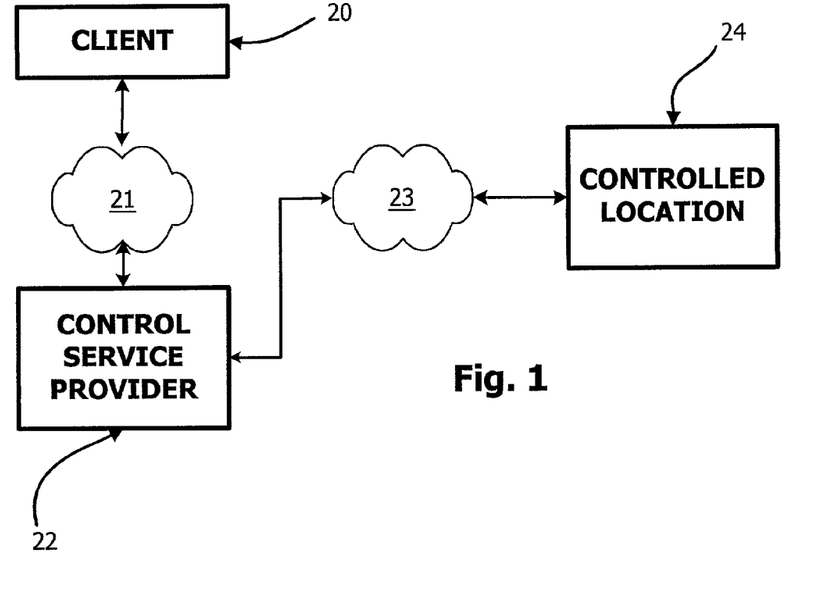
FIG. 1 is a block diagram of an embodiment.

FIG. 1 is block diagram illustrating the major components typically utilized in the use of a control service provider for embedded devices at a controlled location with a telephone interface and the embodiments disclosed herein. In the present embodiments, the control service provider 22 is in electronic communication through a communications network 23 with one or more controlled locations 24. The controlled location (or locations) 24 includes one or more embedded devices (or embedded systems) and may also be in electronic communication with one or more embedded device networks. The communications network 23 may include a variety of networks enabling electronic communications, including, for example, direct dial up connections (a telephone network), connections through a LAN, a wireless network, a WAN, an intranet, the Internet or any other means of electronic communication. As shown, a computer network 21 may also provide electronic communications between the service provider 22 and a number of other components. In the embodiments herein, the computer network 21 includes the Internet or any other computer network.

One or more clients 20 may be in communication with the computer network 21. A client 20 may be any computer that interacts with the controlled location 24 through the control service provider 22. Clients 20 may include owners of the controlled location 24, those managing the controlled location 24, they may be device manufacturers (not shown), software vendors (not shown), information providers (not shown), data collectors (not shown), controlling or monitoring services (not shown), etc. These examples are only meant to be illustrative and are not meant to limit the broad scope of what may be considered a client 20.

Figure 2:
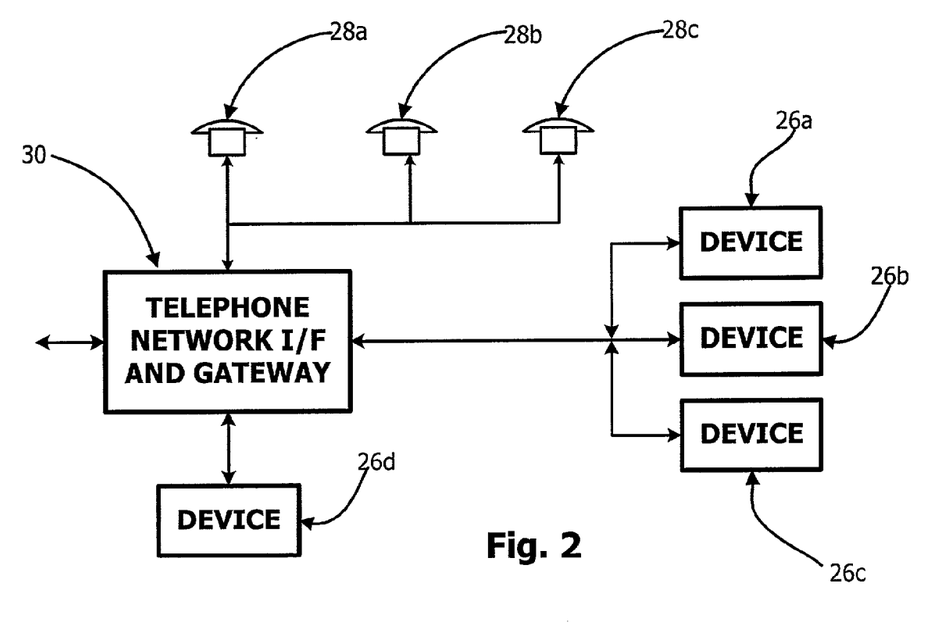
FIG. 2 is a block diagram of components included in an embodiment of a controlled location.

FIG. 2 is a block diagram of hardware components included in an embodiment of a controlled location 24. An embodiment of a controlled location 24 includes one or more devices 26, a telephone network interface and gateway computer 30 and one or more telephones 28. The telephone network interface and gateway 30 is in electronic communication with one or more embedded devices 26. The telephones 28 are in electronic communication with the telephone network interface and gateway 30. The telephone network interface and gateway 30 are in communication with each other. As shown in FIG. 2, the telephone network interface and gateway 30 may be implemented as one component, or they may be implemented as separate components, as will be shown in FIG. 3. The telephone network interface and gateway 30 may include a desktop computer with software designed to accomplish the functionality required. Alternatively, the telephone network interface and gateway 30 may be embodied in an embedded controller with software or firmware designed to accomplish the functionality required. Those skilled in the art will appreciate the various hardware and software components that may be utilized to achieve the functionality of the telephone network interface and gateway 30.

The embedded device 26 is any device, appliance, machine, tool, or the like that is capable of receiving and/or sending electronic signals or messages or that may be enabled to receive and/or send electronic signals. The term "electronic signal" as used herein broadly refers to any electrical signal, electronic signal, electro-magnetic signal, wireless signal or other similar signal. Examples of devices 26 within the scope of the term device includes a vending machine, a telephone, a door lock, a temperature sensor, a motor, a switch, a light, a printer, a fax machine, a refrigerator, a health monitor, an elevator/escalator, a copier, a scanner, manufacturing equipment, industrial equipment, computer equipment and peripherals, security systems, monitoring equipment, and the like. The device 26 typically includes a processor (often, but not always, a microcontroller), memory, and a communications system as well as other input/output components.

The various components used with embodiments herein may be in electronic communication with one another through various types of communication techniques. For example, embodiments herein may be used with many kinds of computer networks.

In embodiments herein, the telephone network interface and gateway 30 may be connected to the embedded devices 26 through a variety of connections, including RS 232, RS 485, modem, Ethernet, powerline, wired connection, wireless connection, etc. The embedded device 26 may be connected to various input and output devices (not shown) through a variety of ways.

The client computer/device 20 and the gateway 30 are all broadly defined digital computers. A computer, as used herein, is any device that includes a digital processor capable of receiving and processing data. A computer includes the broad range of digital computers including microcontrollers, hand-held computers, personal computers, servers, mainframes, supercomputers, and any variation or related device thereof.

The telephone network interface and the gateway computer 30 may be separate computers or separate components. In addition, and as will be illustrated, they may be the same computer or same component. It will be appreciated that the functionality of these elements may be distributed across a number of computers, or it may be consolidated down into one or two computers. Thus, the required functionality is needed for embodiments herein, and those skilled in the art will appreciate that many different hardware/software configurations may be used to achieve embodiments herein.

In current design, the gateway component is typically an IBM-compatible personal computer running the Linux, Microsoft Windows NT, ME or 2000/98/95 operating system. Of course, it will be appreciated by those skilled in the art that other types of hardware and/or software may be used to implement the embodiments disclosed herein.

As shown, the client computer/device 20 may also be included with the embodiment. The client computer/device 20 may be a computer similar to that which may be used as a telephone network interface and gateway 30 computer. In addition, other computing devices may be used as the client computer/device 20, for example, besides typical personal computers, a cellular telephone, a personal digital assistant, a pager, etc. may also be used as the client computer/device 20.

The embodiments herein may allow a user at a client computer/device 20 to access data/services at the embedded device 26 through the telephone network interface and gateway 30, even over great distances. The embodiment also allows a user at one of the telephones 28 to access data/services at the embedded device 26 through the telephone network interface and gateway 30. The telephone network interface-gateway 30 and the client 20 may be connected together through various computer networks, such as a LAN, a WAN, the Internet, an intranet, direct-cable connections, dial-up connections, etc., or any combination thereof.

Figure 3:
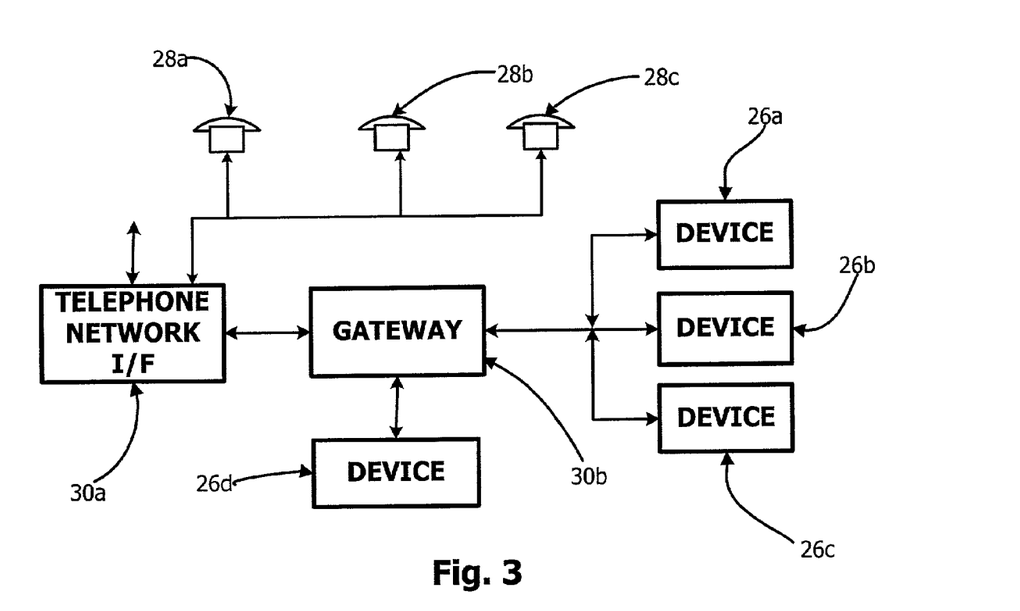
FIG. 3 is a block diagram of components included in a further embodiment of a controlled location.

FIG. 3 is a block diagram of hardware components included in a further embodiment. As shown, an embodiment may include a telephone network interface 30a and gateway 30b implemented as separate components. The gateway 30b is in electronic communication with one or more embedded devices 26. The telephones 28 are in electronic communication with the telephone network interface 30a. The telephone network interface 30a and the gateway 30b are in communication with each other.

Figure 4:
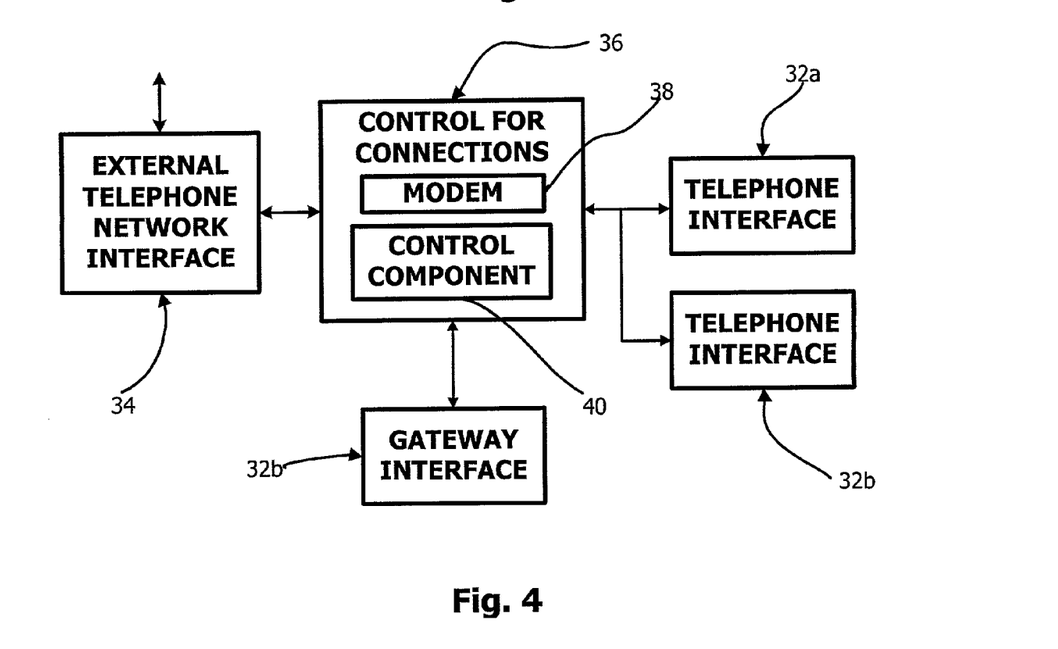
FIG. 4 is a block diagram of an embodiment of a telephone network interface.

FIG. 4 is a block diagram of a telephone network interface 30a. One or more telephone interfaces 32 are included through which telephones 28 may be connected to the telephone network interface 30a. Standard telephone jacks, connectors and wiring may be used to electronically connect and communicate with a telephone 28. An external telephone network interface 34 is included to connect the telephone network interface 30a to the external communications network 23 through which the controlled location 24 will be accessed. Standard jacks, connectors and wiring may be used to implement the external telephone network interface 34. For example, if the external communications network 23 were the public switched telephone network ("PSTN"), the external telephone network interface 34 may include the necessary connectors and wiring to connect the line coming into a home, building, etc., to the telephone network interface 30a.

The telephone network interface 30a also includes a control for connections 36. The control for connections 36 component may be software or hardware or a combination of both. The control for connections 36 control component 40 operates to route communications to the proper destinations. More specifically, the control component 40 functions to route telephone 28 communications to the gateway 30b when device commands or communications are being sent, and functions to route the telephone 28 communications to the telephone network 23 when the user does not wish to access the devices 26 via the gateway 30b. This may be done by detecting a certain sequence of DTMF tones or a voice recognition system to signal when the user wishes to access the embedded devices 26. Once this sequence is received, the control 40 may disconnect the telephone 28 or telephones 28 from the external telephone network interface 34 so that later signals, sounds or commands are not received by the external communication network 23. Those skilled in the art will appreciate that the control component 40 may be hardware, software or a combination of both. For example, the control component 40 may be a microcontroller programmed to perform the desired functions, or it may comprise one or more logic chips, etc.

The control for connections 36 may also include a modem 38 for establishing connections, whether being dialed into or whether dialing out, using the external communications network 23. The modem 38 allows the gateway 30b to dial out and connect with the control service provider 22. The modem 38 also allows the control service provider 22 to dial into the controlled location 24 and connect to the gateway 30b.

Figure 5:
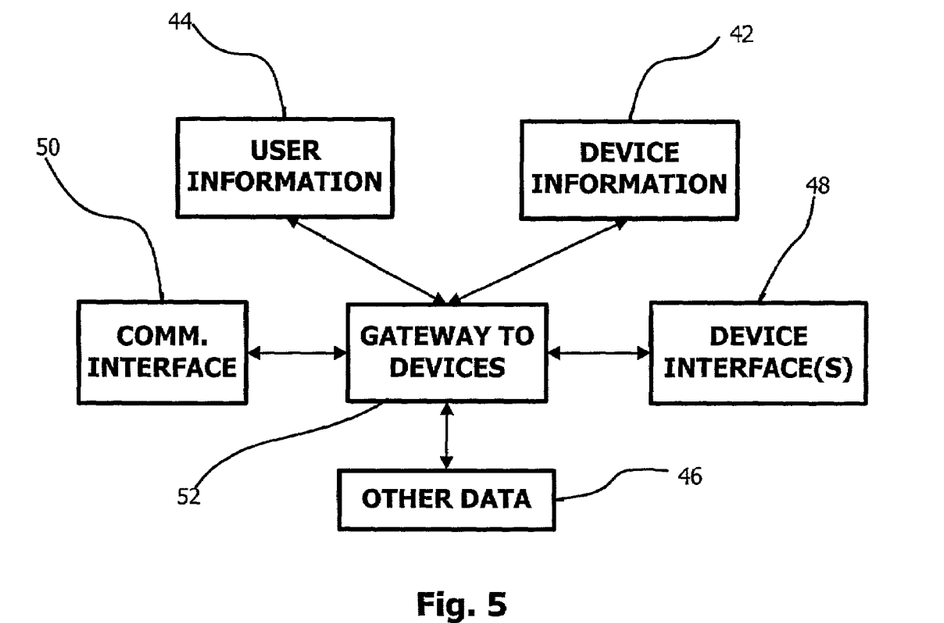
FIG. 5 is a block diagram illustrating an embodiment of a gateway.

FIG. 5 illustrates an embodiment of a gateway 30b. The gateway 30b provides access to the embedded device(s) 26. In the present embodiments, device information 42 about the embedded devices 26 connected to the gateway 30b are stored. This information 42 may include the capabilities of each device, interfaces supported, the data available, etc. This information 42 may indicate what data/services are available at the embedded device 26 and what data types, if any, are used with individual services. This facilitates access via the gateway 30b to the embedded device 26.

The gateway 30b may also include user information 44. The user information 44 may include data that describes the user(s) that may access the devices 26 through the gateway 30b. Such data 44 may include username, password, identification number, address information, etc. The user information 44 may be used to verify that a particular user is authorized to access the embedded device(s) 26 before allowing them to do so. Other data 46 may also be stored and/or accessed by the gateway in performing its operations.

Device interface(s) 48 provide the necessary communication hardware and/or software to connect the gateway 30b to the embedded devices 26. Depending on the particular embedded devices 26, various means may be used to communicate. Such means are typically dictated by the capabilities of the embedded devices 26. Those skilled in the art will appreciate how to establish electronic communication with an embedded device 26, given a particular embedded device or type of device.

The communication interface 50 provides the necessary communication hardware and/or software to connect the gateway 30b to the telephone network interface 30a. Depending on now the telephone network interface 30a is implemented, the communication interface 50 may vary. For example, if the telephone network interface 30a and the gateway 30b are implemented in the same component 30, as shown in FIG. 2, the software implementing the two components 30a, 30b may simply communicate as needed, without requiring any additional hardware. If the telephone network interface 30b and the gateway 30a are implemented as separate components, as shown in FIG. 3, some hardware and/or software may be needed. For example, the following types of electronic communication means may be used along with the required hardware and/or software: a serial port, a parallel port, a USB port, a wireless interface, a custom connection, etc. Those skilled in the art will appreciate the many different ways in which two components may be configured to be in electronic communication with one another.

The gateway to devices 52 provides communication to and from the devices 26 for other computers and/or software that need to communicate with the embedded devices 26. The gateway to devices 52 hardware and/or software is configured/programmed to communicate with at least one type of embedded device 26. In the embodiments shown herein, the gateway to devices 52 is programmed to communicate with several different types of embedded devices 26. In addition, the gateway to devices 52 may be programmed to communicate using many protocols so that it may communicate with different types of device networks. Depending upon the type of device 26 that the gateway to devices 52 needs to communicate with, different functionality may be programmed in the gateway to devices 52. For example, if one device 26 only understands one protocol, the gateway to devices 52 may be programmed to also understand that protocol so that it may communicate with the device 26. Alternatively, the device 26 may be programmed with an additional protocol that the gateway to devices 52 understands.

The gateway to devices 52 may also be programmed to access data and services at the devices 26. Typically, data, functions, events, etc., on the device 26 that someone may want to access are made available by programming the gateway to devices 52 and/or the device software to expose these items. Those skilled in the art will appreciate that the device 26 may be programmed to allow access to items on the device 26, or the gateway to devices 52 may be programmed to access the items on the device 26, or a combination of programming in the device software as well as the gateway software may be accomplished to facilitate access to items on the device 26.

The gateway software also has the functionality to allow computers, clients 20, and users at telephones 28 connected through the telephone network interface 30a, to send and receive data or messages to the devices 26 through use of the gateway software. Accordingly, the gateway includes the functionality that would allow computers, clients and telephones to send messages to the gateway. For example, the gateway may understand and be able to communicate using TCP/IP. In addition, the gateway may include an application programming interface ("API") that other computers may use in communicating with the gateway. The gateway would receive the message and perform any processing necessary. In some circumstances, the gateway may forward the message on, whether in the same form or in an alternate form, to a particular device 26 or devices. The gateway may have the necessary information and/or functionality to process the message and respond to the message without needing to access or communicate with a device 26. The gateway may also include the necessary hardware and/or software to receive and process DTMF tones. Voice recognition software may also be used for users to issue commands and requests through voice. The gateway may also be programmed to generate voice responses for users.

There are commercially available hardware packages, software packages and technology that would serve as the gateway and that also could serve as the device software. emWare, Inc. provides solutions that can be used as the gateway and that can be used as the device software or to implement the device software. More particularly, EMIT® (Embedded Micro Internetworking Technology) software from emWare may be licensed and used to implement gateway software and/or device software. In addition, there are other commercially available hardware and software packages that may be used to achieve the gateway functionality.

Figure 6:
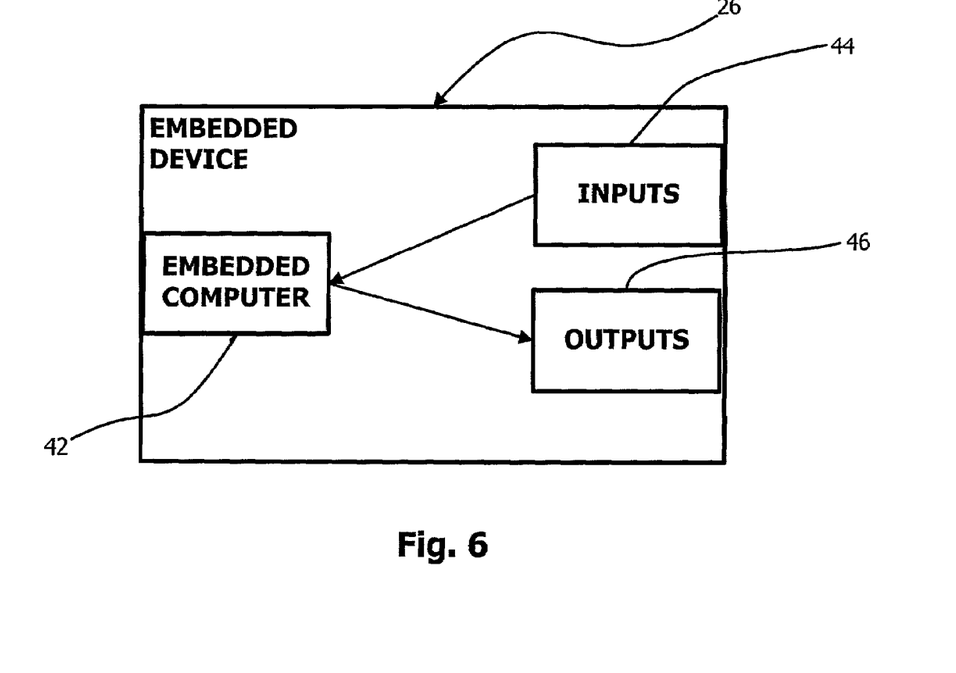
FIG. 6 is block diagram illustrating certain components of an embedded device.

FIG. 6 is block diagram illustrating the major hardware components typically utilized in embedded devices 26 or systems and embodiments herein. An embedded device 26 typically includes a processor 42 or embedded computer 42 in electronic communication with input devices 44 and/or output devices 46. The embedded computer 42 is operably connected to input 44 and/or output devices 46 capable of electronic communication with the embedded computer 42, or, in other words, to devices capable of input and/or output in the form of an electrical signal. Sometimes the input and output device(s) 44, 46 and the embedded computer 42 or processor 42 are both housed within the same physical structure. The input and/or output data sent and/or received may be referred to herein as interface data.

Figure 7:
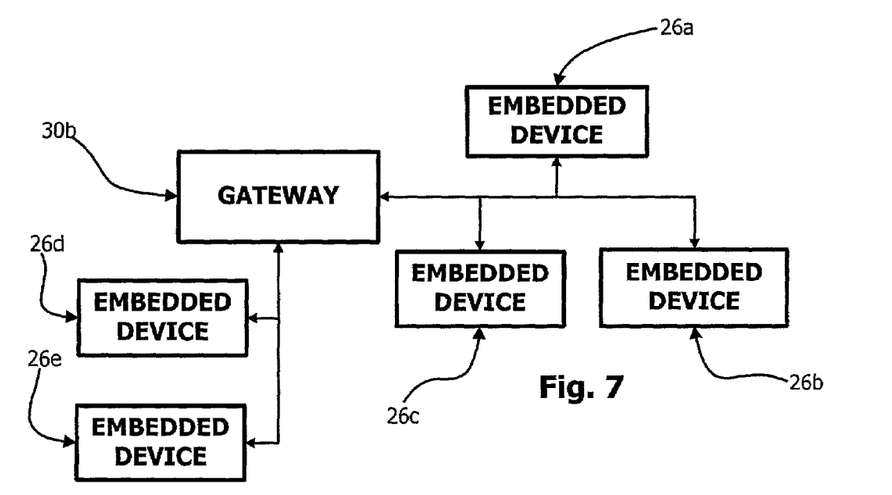
FIG. 7 is block diagram illustrating an embodiment of a gateway in communication with embedded devices.

FIG. 7 is block diagram illustrating the major hardware components typically utilized in an embedded device network connected to a gateway 30b. Typically the gateway 30b computer is networked together with one or more embedded devices 26. The computer 30b acts as a gateway between the embedded devices 26 and other computers, clients 20, the control service provider 22, or users at the telephone(s) 28 or other devices 26. In the present embodiments, the control service provider 22 is used to access the controlled location 24 that includes a gateway 30*b* computer connected to one or more embedded devices 26. Typically the embedded device 26 includes an embedded computer 42 connected to input and output devices 44, 46. Particularly, in the present embodiments, the embedded computer 42 typically is a microcontroller (not shown). However, it will be appreciated by one skilled in the art that the functions and processing normally carried out by a microcontroller could be carried out by larger processors, whether they are part of a larger controller or part of a typical computer system.

The embedded computer 42 is typically remote from the gateway 30*b* in that the embedded computer 42 and gateway 30*b* are each computers capable of functioning on their own. The term remote does not necessarily mean that the embedded computer 42 is at a different location than the gateway computer 30*b*, although in embodiments the gateway 30*b* may be at a different location than the embedded computer 42. Those elements discussed as being stored and/or implemented by the embedded computer 42 could be stored and/or implemented at the gateway 30*b* computer, in some circumstances.

The present systems and methods have broad application to many kinds of computer networks. Generally, embodiments of a control service provider 20 provide monitoring and/or controlling of embedded devices 26. The embedded computer 42 is operably connected to input and/or output devices 44, 46 capable of electronic communication with the remote computer 42, or, in other words, to devices capable of input and/or output in the form of an electrical signal. The service provider 22 establishes communication with the embedded device 26 through the gateway 30*b* to send and/or receive input and/or output data and to thereby interact with embedded devices 26.

The gateway 30*b* computer is a broadly defined digital computer. The embedded device 26 or system 26 includes a digital computer but does not usually have typical input and/or output devices such as a keyboard, mouse, and/or monitor. A computer, as used herein, is any device that includes a digital processor capable of receiving and processing data. A computer includes the broad range of digital computers including microcontrollers, hand-held computers, personal computers, servers, mainframes, supercomputers, and any variation or related device thereof.

The input and output devices 44, 46 include any component, element, mechanism, appliance, or the like capable of receiving and/or generating an electronic signal. Examples of devices within the scope of the term device includes a vending machine, a telephone, a door lock, a temperature sensor, a motor, a switch, a light, etc.

In current design, the gateway 30*b* computer is typically an IBM-compatible personal computer running Linux, Microsoft Windows 95/98/2000 or the Microsoft Windows NT operating system.

One possible item that may be used with the embodiments herein is a vending machine (not shown). Many vending machines include one or more microcontrollers for controlling different parts of the vending machines. These microcontrollers fall within the scope of embedded computer. The input and output devices include the buttons for selecting items from the vending machine, switches for allowing those items to be dropped down to the user, lights for indicating which items are gone, the change release for releasing any change, etc. As known in the art, this vending machine embodiment includes the input and output devices 44, 46 and the remote computer(s) integrated within the same structure. Those skilled in the art will also realize that the embedded computer 42 may be in a separate structure from its attached input and output device(s) 44, 46 such as a sprinkler controller where electronic valves 46 are remote from the controller. Many of the modem devices do come with embedded microcontrollers, for example, many cellular phones, pagers, and the like come with embedded microcontrollers.

The gateway 30*b* computer may be connected to the embedded devices 26 through a variety of connections, including RS 232, RS 485, modem, powerline, wired connection, Ethernet, wireless connection, etc. Similarly, the embedded computer 42 may be connected to various input and output devices 44, 46 through a variety of ways. As stated, typically the embedded computer 42 comprises a microcontroller (not shown). Microcontrollers often have input/output ports for communicating with external devices. The specifications of the particular microcontroller often dictate how a device is connected to the microcontroller. Those skilled in the art appreciate how different devices may be connected to computers, whether they are embedded computers, standard desktop computers, mainframes, etc.

Figure 8:
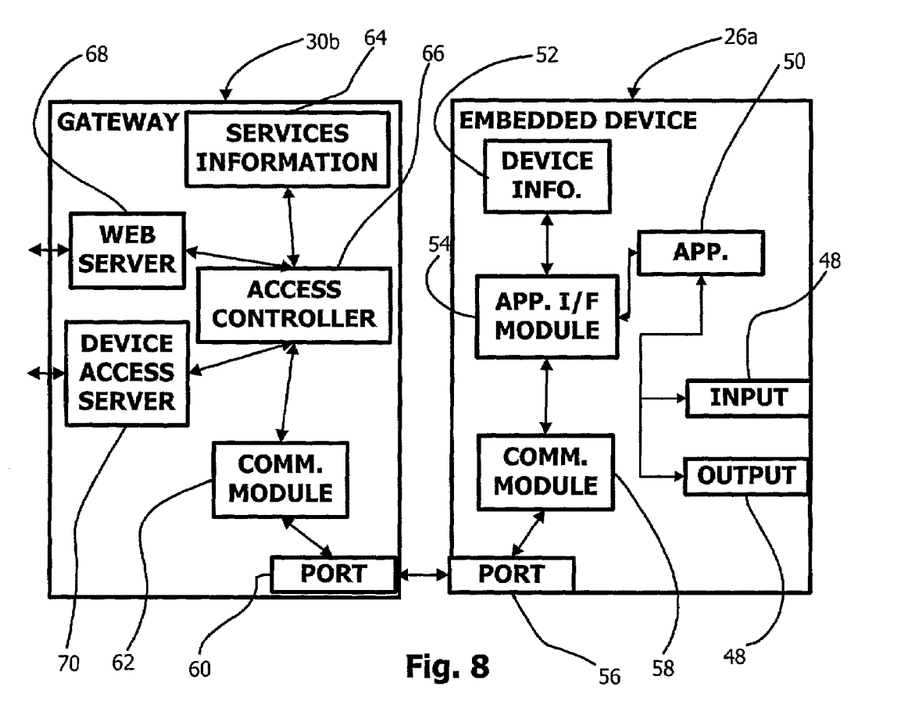
FIG. 8 is a block diagram depicting hardware and software components of an embodiment of a gateway in electronic communication with an embedded device.

FIG. 8 depicts a block diagram of the major hardware and software components of an embodiment of a gateway 30*b* in electronic communication with an embedded device 26. As shown, certain elements of FIG. 8 correlate with those of FIG. 7. Those skilled in the art will appreciate that there are a variety of ways to interconnect the various components, and that there are various configurations wherein one or more of the elements may be eliminated by moving functionality from one element to another.

The present embodiments enable a user to monitor and/or control services provided by the embedded device 26 through the service provider 22 and/or through use of a telephone 28 in electronic communication with the telephone network interface 30*a*. The services of the embedded device 26 may be exposed by the embodiments such that they may be accessed over the networks 21, 23 and/or through a telephone 28 and in an efficient manner.

In the present embodiments, data from input and/or output devices 44, 46 is read in and/or written out through input/output ports 48. An embedded application program 50 includes the executable instructions that directly interface with these input and/or output ports 48.

Users, through software running on the control service provider 22 or through the telephones 28 and telephone network interface 30*a*, may wish to access certain services or data provided by the embedded device 26. Services include different functions, variables, events, and/or files. For example, users may wish to execute particular functions, access certain variables, check on specified events, or access specific files. In current design, the services that a user may need access to are identified and listed. The identification of services also includes information about the certain services. This identification of certain services may be accomplished in a variety of ways. For example, in current design, device information 52 may be stored at the embedded computer 42. The device information 52 may be stored as a file, or it may be stored as static data that is compiled with the application 50, or it may be stored on a storage device (not shown) external to the remote computer 42. Those skilled in the art will realize that there are a variety of ways to store basic information about certain services provided by the application code running on the embedded computer 42.

By storing information about certain services at the remote computer 42 or at the embedded device 26, client software or software at the telephone 28 can readily ascertain what services are available at the embedded device 26. Usually the application code 50 defines the services. The device information 52 functions to provide information about certain services, where the information would be useful to a user at the gateway 30b, at the service provider 22, at a telephone 28 or a user at a client 20 across the computer networks 21, 23. A capabilities table may also be provided at the embedded computer 42.

In current design, an embedded application interface module 54 provides access between the services at the embedded computer 42 and software running at the gateway 30b computer and/or to software running at the service provider 22, clients 20 and telephones 28. In embodiments herein, the interface module 54 uses information from the device information 52 to access the desired item on the remote computer 42. Further, in the presently preferred embodiment, the interface module 54 is reentrant code.

The interface module 54 communicates through a communications port 56. In current design, a communications module 58 provides communication using the communications port 56. One skilled in the art will appreciate, however, that the interface module 54 may include the code necessary to directly interface with the communications port 56 at the remote computer 42. The communications module 58 or code provides access to the communications port 56, and ensures that data is given to the communications port 56 in appropriately sized and formatted pieces, and that data received from the communications port 56 is correctly read from the port 56.

The gateway 30b computer includes a communication port 60 in electronic communication with the communications port 56 of the embedded device 26. As discussed earlier, there are a variety of such ports available with computers that are capable of interfacing with a remote and/or embedded computer port. A communication module 62 provides features similar to those provided by the communications module 58 of the embedded computer 42. The communications module 62 correctly formats data that is written to and read from the communications port 60.

The gateway 30b computer provides access to the services provided at the embedded computer 42 and at the embedded device 26. In the present embodiments, a portion of the device information 52, the interfaces supported information, is retrieved from the embedded device 26 and stored in services information 64 created at the gateway 30b computer and/or at the service provider 22 that substantially corresponds to the services of the embedded device 26. The list of services at the gateway 30b computer is referred to in FIG. 8 as services information 64. The services information 64 indicates what services are available at the embedded device 26 and what data types, if any, are used with individual services. This facilitates access via the gateway 30b computer to the embedded device 26.

In current design, a process is initially started on the gateway 30b computer and/or by the service provider 22 that causes the services information 64 to be created. The device access controller 66 provides this initial direction, in current design.

As stated, the embodiments may provide access to the services of the embedded device 26 to computers that are in electronic communication with the computer networks 21, 23 and to the service provider 22 and to the telephones 28. To facilitate access by computers and telephones 28, the gateway 30b computer and/or the service provider 22 may include servers. A web server 68 may be started at the gateway 30, 30b computer and/or at the service provider 22. The web server 68 may provide a web interface to services at the embedded device 26. For example, the data and/or services of the embedded device 26 may be represented graphically through HTML pages. Thus, the device access controller 66 may create web pages (not shown) from the services available at the embedded device 26, and the web server 68 may service HTTP requests for these web pages.

A device access server 70 may also be included at the gateway 30, 30b computer and/or at the service provider 22 to service client requests for services of embedded devices 26. In current design, the device access server 70 accesses the services information 64 and uses this information to facilitate access to clients at telephones and client computers across the computer networks 21, 23.

Figure 9:
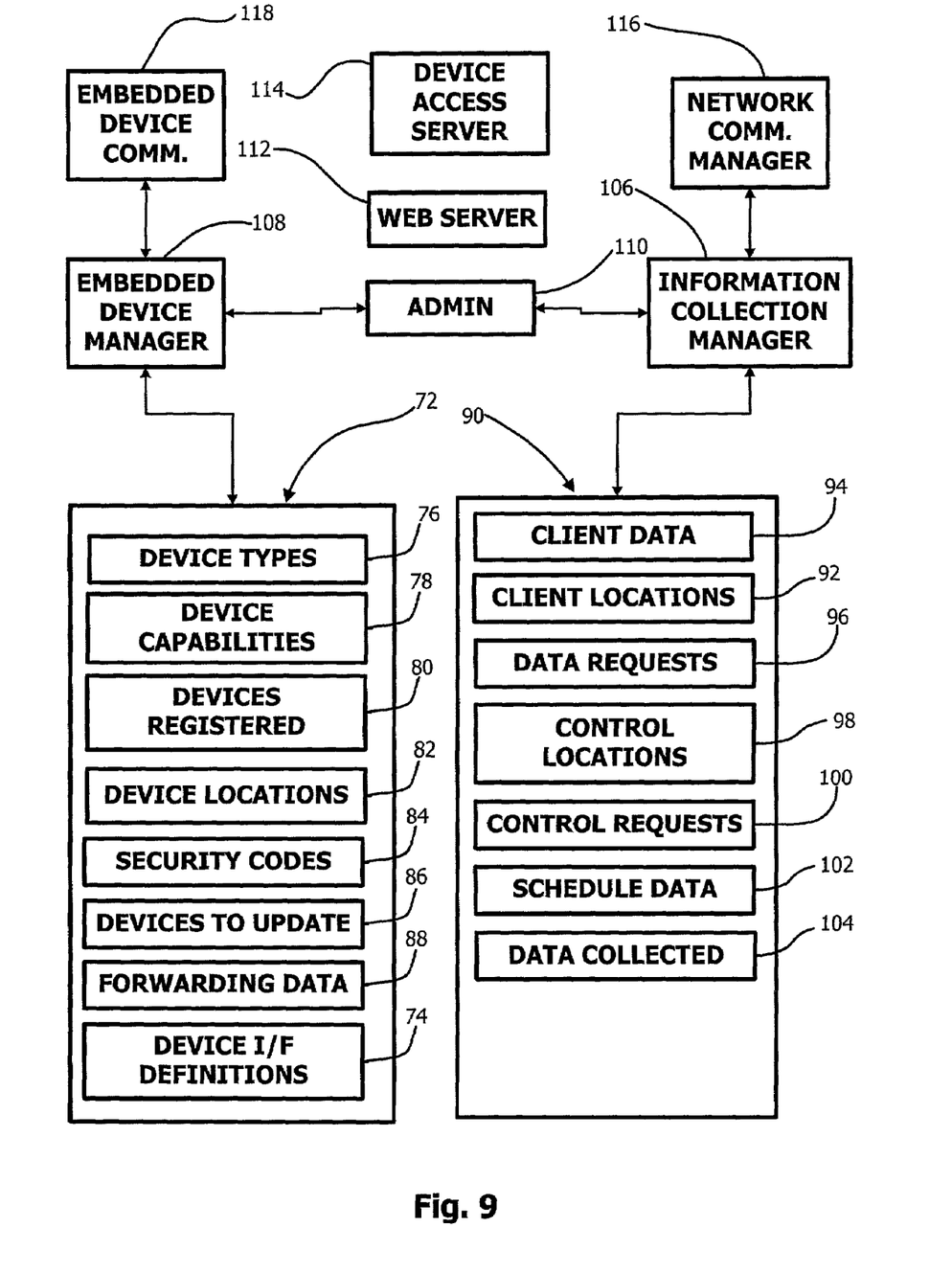
FIG. 9 is a block diagram illustrating software and data components of an embodiment of a control service provider.

FIG. 9 illustrates the software and data components that may be utilized in an embodiment of a control service provider 22. The service provider 22 includes a database 72 of embedded device information. This database 72 may be made available to, or made accessible by computers in electronic communication with the computer networks 21, 23. Database as used herein means any data structure or structures used to store data. A database may be one or more files, it may be a commercially available database package, etc. The embedded device information database 72 may contain information one skilled in the art would need to provide an interface to services of embedded devices 26. The embodiment of the embedded device information database 72 shown in FIG. 9 illustrates what types of data may be stored in the embedded device information database 72. Device interface definitions 74 that define how to communicate or interface with embedded devices 26 may be included.

A device types 76 data structure may contain information about what embedded devices 26 can be accessed and logical groupings of these devices 26. A device capabilities 78 data structure may include information on what capabilities each particular embedded device 26 has, similar to the capabilities table discussed above. Devices registered 80 information may contain information on what embedded devices 26 have been in contact with the service provider 22, which device's services have been paid for, etc. Device locations 82 may indicate where the embedded devices 26 are located, either in geographic terms or in electronic terms (such as, for example, a telephone number, an IP address, routing information, etc.).

The information in the embedded device information database 72 may be created without access to the embedded devices 26, or it may be created from information obtained from the embedded devices 26.

Embodiments herein may also implement security measures. For example, there may be embedded devices 26 and/or certain services of embedded devices 26 that should only be accessed by an entity holding the proper authority. A more specific example of this is a vending machine. A vending machine may only need to be accessed by particular entities, or it may have certain functions that should only be accessed by an authorized entity, such as, for example, the ability to change the prices on certain items, to drop certain items without payment or to lock certain items so that they may not be purchased. To provide proper authentication and access to embedded devices 26, the service provider 22 may include security codes 84 or information for validating proper client access. User names and passwords may be stored in the security codes 84 data to validate proper authorization.

Devices to update 86 information may be a listing of embedded devices 26 that need some type of updating. Forwarding data 88 may include information about where data from or relating to an embedded device 26 should be forwarded.

Another database 90 may be used by the service provider 22 to store information relating to entities, information, etc. on the computer networks 21, 23 or in the controlled location 24, and this database 90 and/or the information in this database 90 may be made available to embedded devices 26. This database 90 may include client locations 92 as well as client data 94. Controlling/monitoring services locations 98 and their requests 96 may be stored. The controlling/monitoring requests data 100 may include schedule data 102 that indicates which devices should be controlled/monitored and how often they should be controlled/monitored. The schedule data 102 may include embedded device identifications and routing data.

In addition, other data collected 104 may be stored in the database 90. In embodiments herein, the locations stored are in the form of IP addresses, but it will be appreciated by those skilled in the art that other types of data may be stored that would indicate how to contact a particular entity.

An information collection manager module 106 may manage the data being stored into and read from the information database 90. Similarly, an embedded device manager 108 may manage the data being stored into and read from the embedded device information database 72. An administrator module 110 may coordinate the operation of the service provider 22 and the communications between the managing modules 106, 108 and other modules included with the service provider 22.

As discussed in relation to FIG. 8, a web server 112 and a device access server 114 may be included in the service provider 22 to facilitate providing services to or for the embedded devices 26. A network communications module 116 may handle communications accomplished via the networks 23, 21. An embedded device communications module 118 may handle communications with the embedded devices 26. The embedded device communications module 118 may include both hardware and software components. For example, if embedded devices 26 are able to dial in directly to the service provider 22, the embedded device communications module 118 may include a modem bank (not shown) as well as communication software to handle the incoming calls and data communications. However, the embedded device communications module 118 may also use other communications hardware that is being shared by other resources. In this case, the embedded device communications module 118 would typically include software to handle the communications that it is to receive. Those skilled in the art will appreciate the many communication packages and alternatives, both hardware and software, that may be utilized in the embodiments of a service provider 22.

Figure 10:
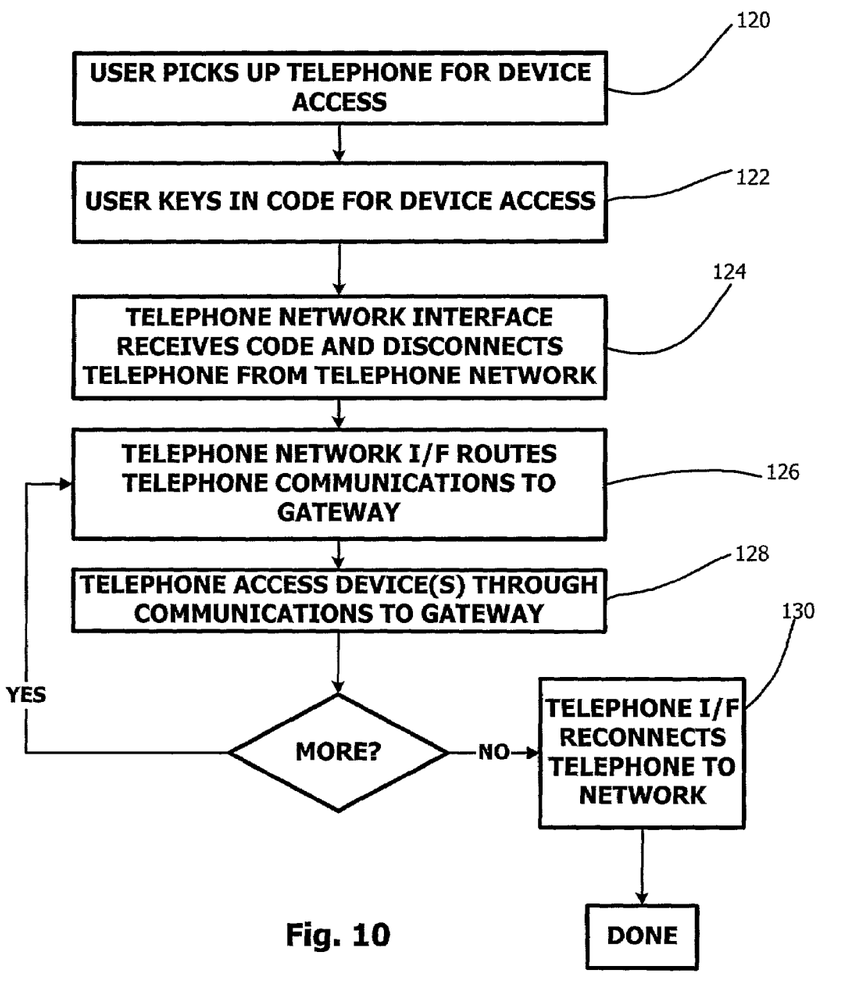
FIG. 10 is a flow diagram of a method used with an embodiment.

FIG. 10 is a flow diagram of a method used with an embodiment. When a user at a telephone 28 desires to access an embedded device 26, the user picks up 120 the telephone for accessing the device 26. In the embodiment of FIG. 10, the user then keys 122 in a code for device access. The code may be a particular number sequence, for example, the user may access the devices by first dialing "#9". The telephone 28 may also include a specialized key or tone to indicate that the user wishes to access a device 26. The telephone network interface receives 124 the code and disconnects the telephone from the telephone network. By doing this, the telephone network will receive commands from the phone to access a certain device. The telephone network interface also cause the telephone 28 to appear to be hung up so that incoming telephone calls may be received by the telephone network interface and processed by the interface or by the other telephones 28 not executing device access commands.

The telephone network interface may then route 126 the device commands from the telephone 28 desiring to access the device to the gateway. By routing the commands to the gateway, the gateway may then process the commands and provide the device access required to the user at the telephone. In addition, the telephone network interface may be programmed with more capability than to simply route the communications to the gateway. The telephone network interface may receive these commands and perform some processing on these commands before issuing a command to the gateway. For example, if the gateway only understood certain commands in a particular format, the telephone network interface may perform a translation from the command received from the telephone 28 to a message or command that the gateway would understand. The telephone 28 may then access 128 the device 26 or devices 26 through the gateway. If more commands are to be sent to and/or from the telephone 28, the embodiment may repeat the process. Once the session is complete, the telephone network interface may reconnect 130 the telephone 28 to the telephone network so that the user at the telephone 28 may make or receive telephone calls.

Figure 11:
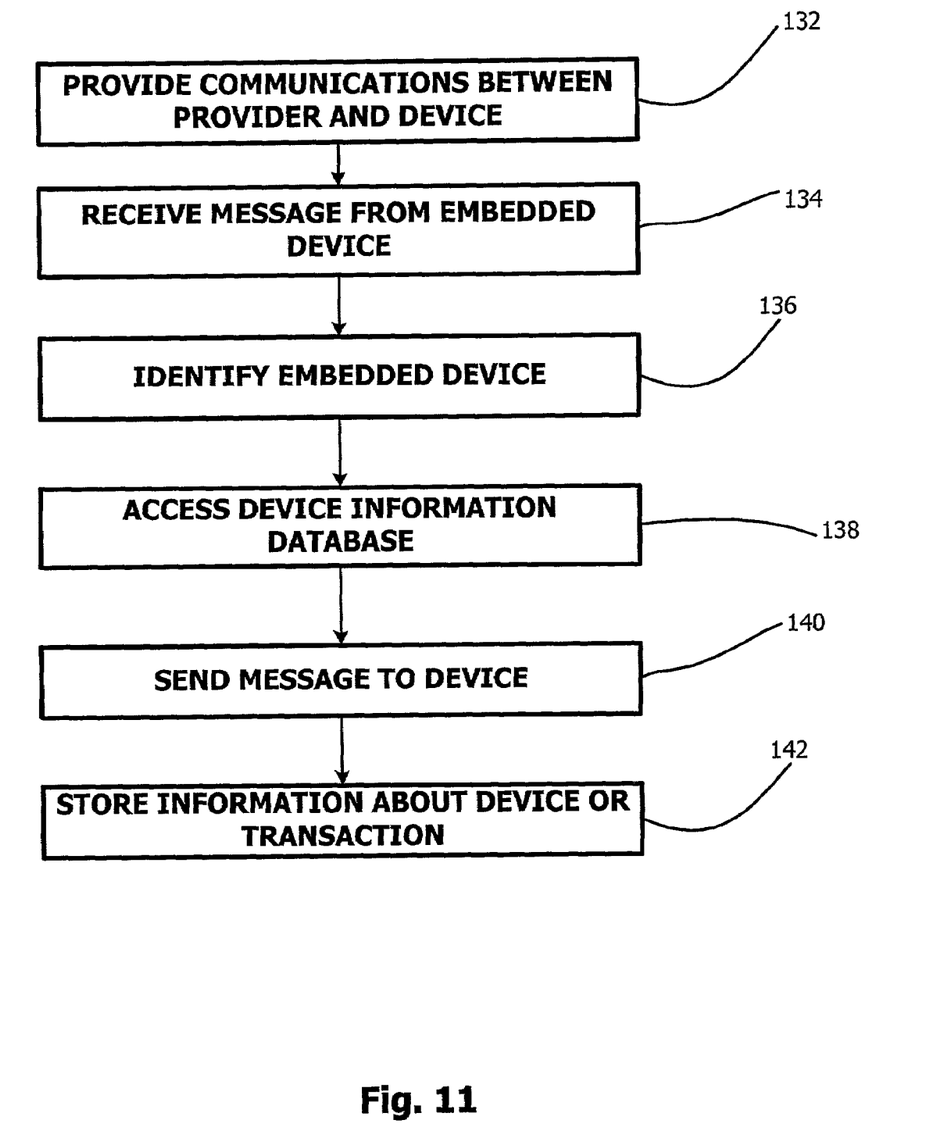
FIG. 11 is a flow diagram of a method used with an embodiment.

FIG. 11 is a flow diagram illustrating steps of a method of an embodiment for providing service to a plurality of embedded devices 26. Electronic communications are provided 132 between the service provider 22 and an embedded device 26. A message may then be received 134 from the embedded device 26. The embedded device 26 may then be identified 136 through use of the message received. This identification may either be of the particular embedded device 26 or of the type of embedded device 26. The service provider 22 may access 138 the embedded device information database. In embodiments herein, the service provider 22 is able to identify embedded devices 26 after accessing the embedded device information database 72. Accordingly, those skilled in the art will appreciate that a number of the steps herein may be performed in various orders to accomplish substantially similar results. The service provider 22 may send 140 a transmit message to the embedded device 26 and store 142 device information descriptive of a transaction. Information about the transaction (about the message(s) sent or received) may be used for billing purposes.

Other steps may also be performed in practicing present embodiments. For example, newly obtained information from the computer network(s) (to be placed in the information database 90) may be linked to certain information in the embedded device information database 72. In this way, the service provider 22 will be aware of updated information when dealing with a particular device 26 or type of device. The message received from the embedded device 26 may be parsed to obtain an embedded device identifier, which may be a number, a text string, etc. Methods practiced herein also may use the schedule data of the controlling/monitoring requests to monitor or control embedded devices.

Figure 12:
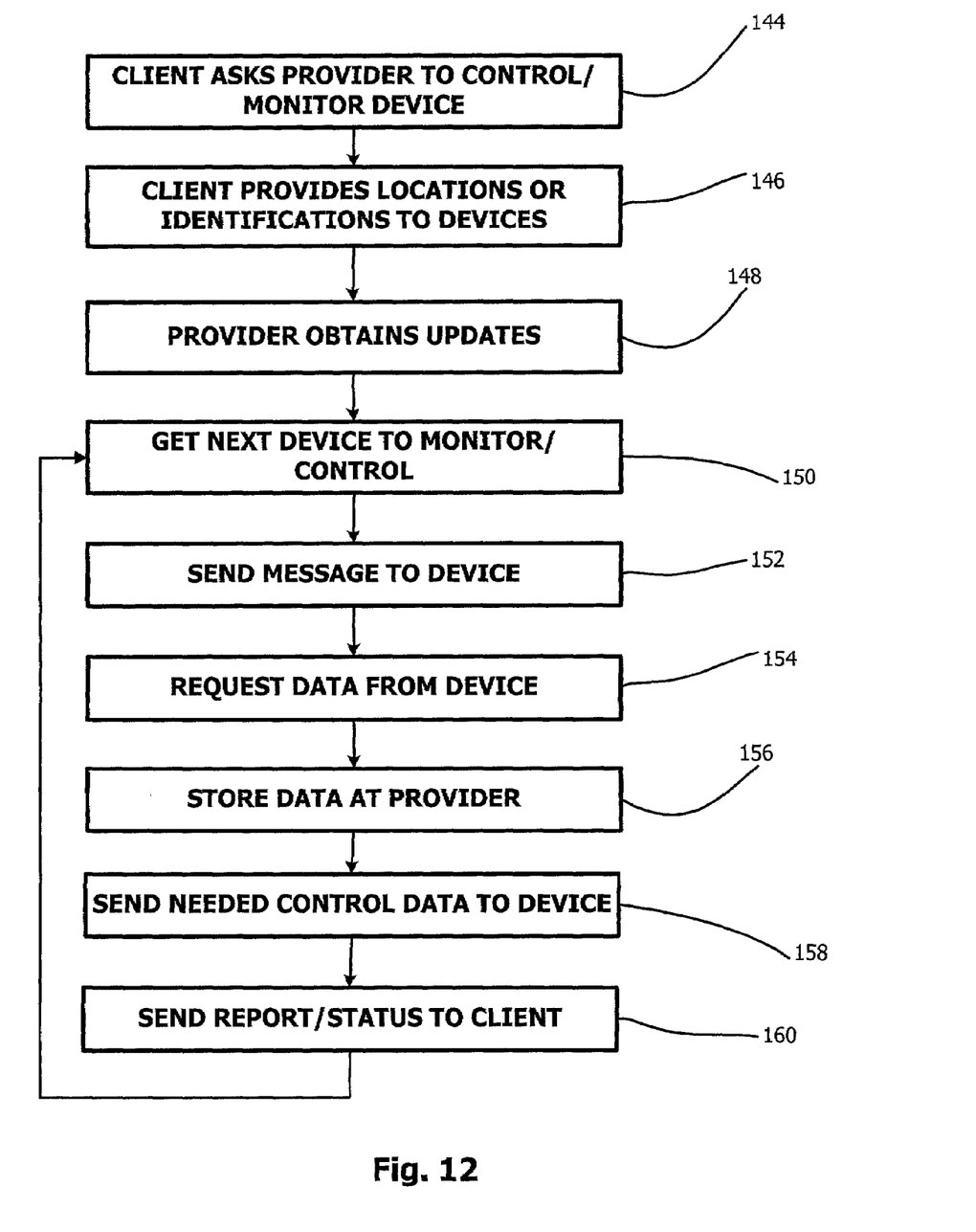
FIG. 12 is a flow diagram of a method used with an embodiment.

FIG. 12 is a flow diagram illustrating steps of a method of an embodiment for providing service to a plurality of embedded devices 26. Clients 20 may ask 144 an embodiment of a service provider 22 to monitor and/or control one or more embedded devices 26. The client may provide 146 the locations (whether electronic addresses or physical locations) or identifications of the embedded devices 26 to the service provider 22. The service provider 22 may obtain 148 any data or software updates that may be needed by the embedded devices 26.

The service provider 22 may then enter an iterative loop to control/monitor embedded devices 26. The provider 22 may get 150 the next device 26 to monitor or control.

Depending on whether this is the first iteration through a particular list of devices to monitor/control, this step may either be getting the next device or getting the first device in a particular list. The service provider 22 may then send 152 a message to the device and establish communications. The provider 22 may then request 154 data, which may be interface data, from the device and store 156 the data obtained. If control has been requested, the service provider 22 may send 158 control data to the device 26. This control data may include directions or instructions for the device 26 to facilitate control. If a client has asked for a report or a status, the service provider 22 may send 160 a report or status to the client. The service provider 22 may then get the next device and cycle through the steps for each additional device.

From the above discussion, it will be appreciated that the present embodiments provide a telephone interface for communicating with embedded devices through a gateway and allowing access from a remote service provider.

The embodiments herein may be embodied in other specific forms without departing from their spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A telephone network interface for facilitating communications through use of a telephone with an embedded device through a gateway and for facilitating communications between a remote service provider and the gateway, the telephone network interface comprising:
    a telephone interface for electronic communication with a telephone;
    a gateway interface for electronic communications with a gateway;
    an external telephone network interface for connecting the telephone network interface to an external telephone network; and
    connection control, the connection control operating to cause the telephone to be selectively in electronic communication with the external telephone network for telephone calls such that a user at the telephone is capable of dialing out and is capable of receiving an incoming telephone call, and the connection control operating to selectively cause the telephone to be in electronic communication with the gateway for communicating with an embedded device such that device requests from the telephone are communicated to the gateway, wherein the gateway is in electronic communication with the embedded device, and the connection control operating to selectively cause the gateway to be in electronic communication with the external telephone network to enable electronic communications between a control service provider and the gateway, and wherein the gateway comprises device information about the embedded device.

2. The telephone network interface as defined in claim 1 further comprising a plurality of telephone interfaces for electronic communications with a plurality of telephones.

3. The telephone network interface as defined in claim 1 wherein the control service provider communicates with the telephone network interface through use of a telecommunications network.

4. The telephone network interface as defined in claim 1 wherein the control service provider communicates with the telephone network interface through use of a global computer network.

5. The telephone network interface as defined in claim 1 wherein the control service provider communicates with the telephone network interface through use of a computer network.

6. The telephone network interface as defined in claim 1 wherein the control service provider includes schedule data to indicate when certain messages are to be sent to certain embedded devices.

7. The telephone network interface as defined in claim 1 wherein the control service provider includes device location data to indicate the address of certain embedded devices.

8. The telephone network interface as defined in claim 1 wherein the device information comprises capabilities of at least one embedded device.

9. The telephone network interface as defined in claim 1 wherein the device information comprises interfaces supported by at least one embedded device.

10. The telephone network interface as defined in claim 1 wherein the device information comprises data available on at least one embedded device.

11. A combined telephone network interface and gateway for facilitating communications through use of a telephone with an embedded device and for facilitating communications between a remote service provider and the embedded device, the combined telephone network interface and gateway comprising:
    a telephone interface for electronic communication with a telephone;
    an external telephone network interface for connecting the telephone network interface to an external telephone network;
    a gateway for electronic communications with the embedded device, the gateway being programmed to communicate with the embedded device, and the gateway also being programmed to enable communications with the embedded device from a control service provider;
    connection control, the connection control operating to cause the telephone to be selectively in electronic communication with the external telephone network for telephone calls such that a user at the telephone is capable of dialing out and is capable of receiving an incoming telephone call, and the connection control operating to selectively cause the telephone to be in electronic communication with the gateway for communicating with an embedded device such that device requests from the telephone are communicated to the gateway, wherein the gateway is in electronic communication with the embedded device, and the connection control operating to selectively cause the gateway to be in electronic communication with the external telephone network to enable electronic communications between a control service provider and the gateway, and wherein the gateway comprises device information about the embedded device.

12. The combined telephone network interface and gateway as defined in claim 11 further comprising a plurality of telephone interfaces for electronic communications with a plurality of telephones.

13. The combined telephone network interface and gateway as defined in claim 12 wherein the control service provider communicates with the telephone network interface through use of a telecommunications network.

14. The combined telephone network interface and gateway as defined in claim 12 wherein the control service provider communicates with the telephone network interface through use of a global computer network.

15. The combined telephone network interface and gateway as defined in claim 12 wherein the control service provider communicates with the telephone network interface through use of a computer network.

16. The combined telephone network interface and gateway as defined in claim 12 wherein the control service provider includes schedule data to indicate when certain messages are to be sent to certain embedded devices.

17. The combined telephone network interface and gateway as defined in claim 16 wherein the control service provider includes device location data to indicate the address of certain embedded devices.

18. The combined telephone network interface and gateway as defined in claim 11 wherein the device information comprises capabilities of at least one embedded device.

19. The combined telephone network interface and gateway as defined in claim 11 wherein the device information comprises interfaces supported by at least one embedded device.

20. The combined telephone network interface and gateway as defined in claim 11 wherein the device information comprises data available on at least one embedded device.

* * * * *

UNITED STATES PATENT AND TRADEMARK OFFICE
CERTIFICATE OF CORRECTION

PATENT NO. : 7,242,688 B2
APPLICATION NO. : 09/911152
DATED : July 10, 2007
INVENTOR(S) : Michael L. Howard et al.

Page 1 of 1

It is certified that error appears in the above-identified patent and that said Letters Patent is hereby corrected as shown below:

Column 10, line 3 please delete "modem" and replace it with --modern--.

Signed and Sealed this

Twenty-seventh Day of November, 2007

JON W. DUDAS
*Director of the United States Patent and Trademark Office*